United States Patent Office.

BENJAMIN L. JAMES, OF DENVER, COLORADO.

CALCIMINE COMPOUND.

SPECIFICATION forming part of Letters Patent No. 278,969, dated June 5, 1883.

Application filed February 3, 1883. (No specimens.)

*To all whom it may concern:*

Be it known that I, BENJAMIN L. JAMES, of Denver, county of Arapahoe, and State of Colorado, have invented a new and useful Composition of Matter to be used for Calcimining, of which the following is the specification.

My composition consists of the ingredients named below, combined in the proportions stated, viz:

| | |
|---|---|
| Paris-white or whiting | 44 Parts. |
| Glue | 2.4 " |
| Distilled or undistilled water | 53.2 " |
| Ultramarine-blue | .2 " |
| Chloride of lime | .2 " |
| Total | 100 |

The chloride of lime previous to the mixing of the parts must be dissolved in water. This formula will give a white calcimine; but any desired tint can be obtained by adding the proper color. Preferably this should be a dry color. The formula can be prepared very easily by adding the one part to the other and thoroughly mixing them together.

The chloride of lime will kill or neutralize the animal matter in the glue, which is a very desirable point, as the elements of the glue tend to decay, and may sooner or later destroy the calcimine. Besides that, the chloride of lime will cause the calcimine to have a harder finish; also, on porous walls it acts like a size; and, finally, it combines in a fine calcimine finish the well-known disinfecting properties of the lime.

The preparation as made up is a pulpy or jelly-like composition or material in appearances; but when exposed to a slight heat will become liquid.

While I have above stated certain given proportions for the ingredients of this composition, it is evident that in this mere detail, as in the method of putting together or mixing, I may depart in various ways from the exact proportions stated and from the method or means as laid down, and yet accomplish the desired ends.

The preparation may be packed hermetically sealed or otherwise for storage or shipment, and can be readily handled and used for calcimining and like purposes by any one skilled or accustomed to calcimine work.

Having now described my invention, what I consider new, and desire to secure by Letters Patent, is—

The herein-described composition of matter to be used for calcimining, consisting of paris-white or whiting, glue, distilled or undistilled water, ultramarine-blue, and chloride of lime, combined substantially in the proportions and in the manner specified.

In testimony whereof I have signed my name to this specification in the presence of two subscribing witnesses.

BENJAMIN L. JAMES.

Witnesses:
    HERBERT V. REEVES,
    HORACE W. FRENCH.